(12) United States Patent
Kushnir et al.

(10) Patent No.: US 12,375,160 B2
(45) Date of Patent: Jul. 29, 2025

(54) SORTING-BASED DETECTION OF A SKYWAVE SYMBOL

(71) Applicant: Raft Technology Ltd., Tel Aviv (IL)

(72) Inventors: Jonathan Kushnir, Petach-Tiqva (IL); Alon Goren, Kibutz Givat Haim Meuchad (IL); Ehud Fishler, Shoham (IL); Elad Segalis, Herzlia (IL); Tamir Ostfeld, Kfar Saba (IL)

(73) Assignee: Raft Technology Ltd., Tel Aviv (IL)

( * ) Notice: Subject to any disclaimer, the term of this patent is extended or adjusted under 35 U.S.C. 154(b) by 481 days.

(21) Appl. No.: 18/051,505

(22) Filed: Oct. 31, 2022

(65) Prior Publication Data

US 2024/0146388 A1 May 2, 2024

(51) Int. Cl.
*H04B 7/145* (2006.01)
*H04B 17/309* (2015.01)

(52) U.S. Cl.
CPC ........... *H04B 7/145* (2013.01); *H04B 17/309* (2015.01)

(58) Field of Classification Search
CPC .............................. H04B 7/145; H04B 17/309
See application file for complete search history.

(56) References Cited

U.S. PATENT DOCUMENTS

| | | | | |
|---|---|---|---|---|
| 5,563,918 A | * | 10/1996 | Waldschmidt | H04B 17/20 375/267 |
| 9,941,950 B2 | * | 4/2018 | Babich | H04B 7/145 |
| 10,088,000 B2 | * | 10/2018 | Berwanger | F16D 51/28 |
| 10,778,323 B2 | * | 9/2020 | Babich | H04B 10/25 |
| 10,785,077 B1 | * | 9/2020 | Halay | H04L 5/0044 |
| 11,265,891 B1 | * | 3/2022 | Halay | H04W 72/569 |
| 11,581,940 B2 | * | 2/2023 | Babich | H04B 7/22 |
| 2018/0195566 A1 | * | 7/2018 | Berwanger | F16D 51/28 |
| 2021/0144732 A1 | * | 5/2021 | Köse | H04L 27/0014 |

* cited by examiner

*Primary Examiner* — Hai V Nguyen
(74) *Attorney, Agent, or Firm* — Reches Patents

(57) ABSTRACT

A method for detecting a skywave symbol, the method may include (i) receiving, by a skywave receiver, signals of different subcarriers that are within a skywave frequency range that comprises legal subcarriers and illegal subcarriers; (ii) performing sorting iterations to provide a sorted list of signals intensities; and (iii) providing a detection result indicative of a reception of the skywave symbol based on at least some members of the sorted list.

20 Claims, 7 Drawing Sheets

| Sorting cell 12(1) | If IN<DE(1) then DE(1) = IN |

| Sorting cell 12(2) | If IN<DE(1) then DE(2) = DE(1)<br>If DE(1)<IN<DE(2) then DE(2)=IN |

•   •

•   •

•   •

| Sorting cell 12(N-2) | If IN<DE(N-3) then DE(N-2) = DE(N-3)<br>If DE(N-3)<IN<DE(N-2) then DE(N-2)=IN |

| Sorting cell 12(N-1) | If IN<DE(N-2) then DE(N-1) = DE(N-2)<br>If DE(N-2)<IN<DE(N-1) then DE(N-1)=IN |

| Sorting cell 12(N) | If IN<DE(N-1) then DE(N) = DE(N-1)<br>If DE(N-1)<IN<DE(N) then DE(N)=IN |

FIG. 3

Receiving, by a skywave receiver, signals of different subcarriers that are within a skywave frequency range that comprises legal subcarriers and illegal subcarriers. 210

Processing the received signals to provide a detection result that is indicative of a reception of the skywave symbol or of a lack of reception of the skywave symbol. 220

Determining received signals intensities. 230

Performing sorting iterations. A performing of each sorting iteration (of the sorting iterations) may include performing sorting operations to provide a next sorted list of signals intensities. Different sorting cells of a group of sorting cells are allocated to different pairs of consecutive memory elements of an array of memory elements. A first memory element sorting cell may be allocated to the first memory element. A sorting iteration may include comparing, in parallel and by the group, a current unsorted signal intensity (IN) to a currently sorted list of signals intensities to provide results, and performing, in parallel and by the group of sorting cells, one or more data element placement operations based on the results. 240

Providing the detection result based on at least some members of the sorted list. 250

SORTING-BASED DETECTION OF A SKYWAVE SYMBOL

BACKGROUND

The atmosphere is the gaseous envelope surrounding the planet Earth and comprising a mixture of gases. The ionosphere is the upper part of the Earth's atmosphere. Scientifically, above the stratosphere, which means beyond an altitude of 60 km up to 1000 km, the atmosphere is characterized by a high density of free electrons and free ions, mostly produced by the energetic photo-ionization of UV and X-rays arriving from the sun, and to a minor extent over high latitudes by corpuscular ionization.

A high or relevant density of free electrons and free ions is not a clearly defining characteristic because electrons and ions are present at every altitude in the lower and upper atmosphere.

Therefore, a more practical definition, originating from the first application of long distance radio communications, is that part of the atmosphere in which the density of ionization is sufficient to deflect (Deflected means it bounces back on the plane surface when it is bent by a gravitational force) radio waves in the 2-30 MHz range.

This part of the atmosphere, the ionosphere, includes the following layers: the mesosphere, thermosphere, and exosphere.

The radiation of the sun ionizes gasses in the ionosphere. Several ionospheric layers (regions) can be identified, each layer having its particular composition and being ionized by specific wavelengths in the solar radiation. Modern experimental and theoretical investigations divide the ionosphere into three regions: D, E, and F.

The real heights of the ionospheric layers vary with solar zenith angle time, time of day, seasons, solar cycles, and solar activity.

The F-layer (160-1000 km height) is the layer with the highest electron density, which implies signals penetrating this layer will escape into space atomic. By daylight, the F-layer is split into a lower F1-layer (160-210 km height) and a higher F2-layer (above 210 km height). The E-layer8 (90-160 km height) can only reflect radio waves having frequencies lower than about 10 MHz. The D-layer (60-90 km height), is responsible for high attenuation at the lower HF frequencies, disappears almost completely at night. The F1-layer always disappears during the night and sometimes in winter even during the day.

The F2 layer is present 24 hours a day under all solar terrestrial conditions, making it the most important layer of the ionosphere.

The main characteristics of the F2 layer are its high variability, on timescales ranging from the 11 years of a solar cycle and even longer, to a few seconds during strong interactions with the plasmasphere above (at altitudes >1,000 km) depending on solar-terrestrial conditions. The Sun does affect the electron density of the F2 layers causing a rapid increase after sunrise, with maximum values occurring at any time during the day.

A sporadic E layer occurs at altitudes from 90 to 140 km (the E region). Usually, it is considered independent of the normal E layer of the ionosphere.

Most importantly, sporadic E layers can have an electron density similar to the F region. However, its random time of occurrence and presence at any particular place makes Es layer prediction very difficult.

Electromagnetic waves entering the ionosphere may be refracted back to Earth, depending on the operating frequency.

The High Frequency (HF) band is defined by the International Telecommunication Union (ITU) as radio waves with frequencies between 3 MHz and 30 MHz.

HF radio signals can propagate via 3 different ways:
a. Ground waves: near the ground for short distances, up to 100 km over land and 300 km over sea.
b. Direct waves: available through line-of-sight. Available only in distances with line-of-sight.
c. Skywaves: reflected by the Ionosphere, all distances.

For long distances (more than 1000 km) between the transmitter and the receiver, only skywaves are applicable for HF transmission.

Not all HF waves are reflected by the Ionosphere. If the frequency is too high, the wave will penetrate through the Ionosphere. If it is too low, it will be absorbed by the D region. Furthermore, the Ionosphere is usually not stable. It variates during solar cycles (roughly 11 years), seasons and even during each day. These variations cause difficulties in HF radio transmission. For example, the range of usable frequencies will vary throughout the day, with the seasons, and with the solar cycle.

For long distances between the transmitter and the receiver, one reflection from the Ionosphere is not enough. The radio wave is returned to earth and refracted from the Ionosphere once again. This double "hop" causes significant deterioration in signal power due to the refraction from earth and the double propagation in the D region. Furthermore, multiple number of "hops" can co-exist in a single transmission. The effect of this multi-path translates into severe channel conditions that should be accounted for at the receiver.

Accordingly—skywave signals propagate over a problematic HF channel that exhibits substantial attenuations and/or delays and/or interference that change dynamically over time and frequency.

HF communication also exhibits low throughput.

The transmission over HF is problematic and there is a growing need to provide a system, method and computer readable medium for efficient HF transmission and reception.

SUMMARY

There may be provided a skywave receiver, a method and a non-transitory computer readable medium for detecting a skywave symbol.

BRIEF DESCRIPTION OF THE DRAWINGS

In order to understand the invention and to see how it may be carried out in practice, a preferred embodiment will now be described, by way of non-limiting example only, with reference to the accompanying drawings:

FIG. 3 illustrates an example of a sorting cells and their operations;
FIG. 5 illustrates an example of a method.

DETAILED DESCRIPTION OF THE DRAWINGS

Figure 1:
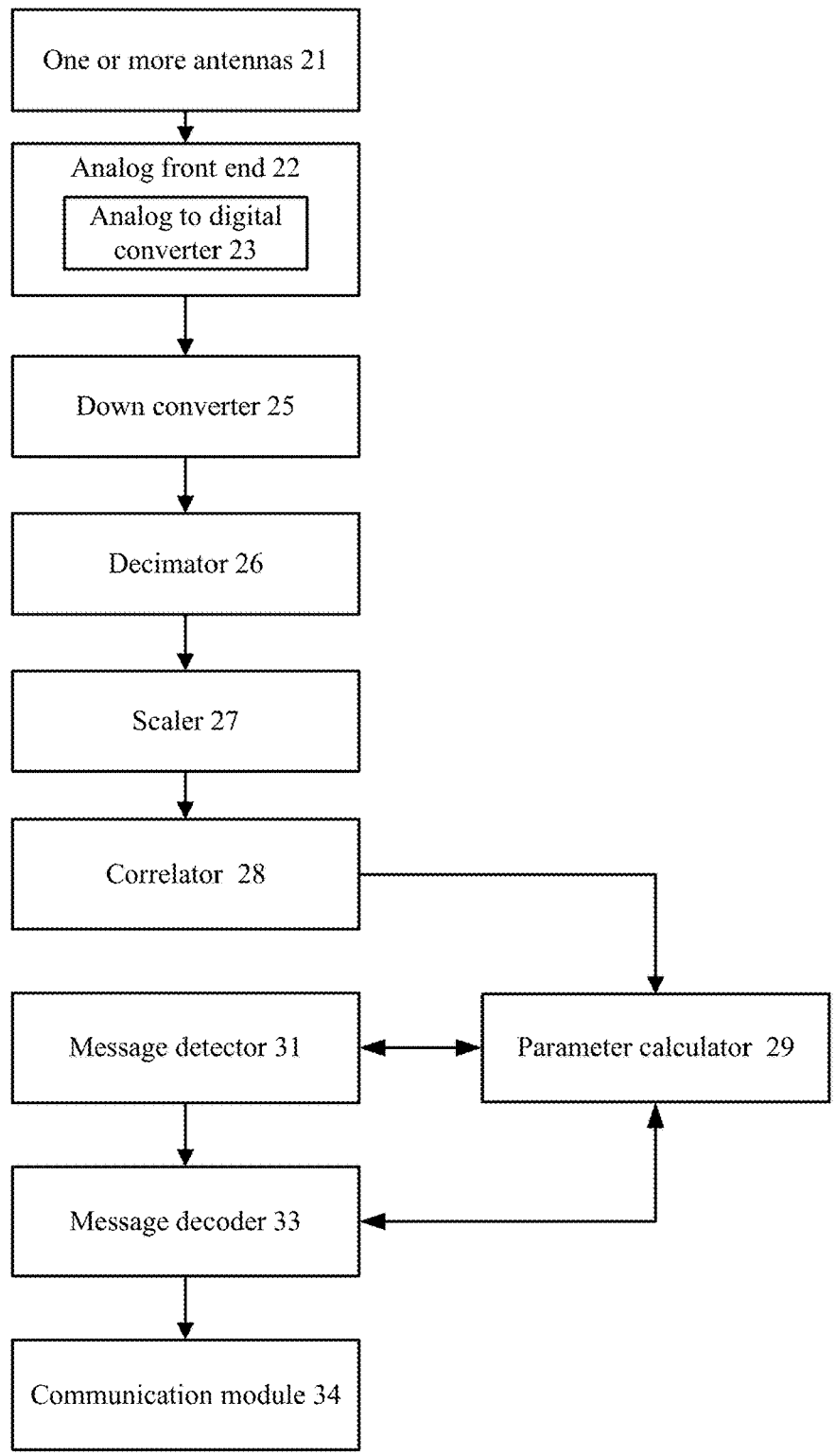
FIG. 1 illustrates an example of a skywave receiver.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Any reference in the specification to either one of a system, a method and a non-transitory computer readable medium should be applied mutatis mutandis to any other of the system, a method and a non-transitory computer readable medium. For example—any reference to a system should be applied mutatis mutandis to a method that can be executed by the system and to a non-transitory computer readable medium that may stores instructions executable by the system.

Because the illustrated at least one embodiment of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any number, or value illustrated below should be regarded as a non-limiting example. For example—a sampling rate may differ from 10 Khz, a duration of a skywave symbol may differ from 6 milliseconds, and the like.

The following systems, receivers, transmitters, method and non-transitory computer readable medium may refer to the reception, transmission and/or any other process related to skywave symbols.

The skywave symbols may convey any information or data. For example—the skywave symbols may convey information related to the stock market.

The skywave symbols may be orthogonal frequency division multiplexing (OFDM) skywave symbols or may differ from OFDM symbols.

The skywave symbols may be synchronous or asynchronous skywave symbols.

For simplicity of explanation it is assumed that the skywave symbols are OFDM asynchronous skywave symbols.

It should be noted that when low latency is required then the transmission of asynchronous OFDM skywave symbols may be more beneficial than the transmission of synchronous skywave symbols.

There may be provided a sorting method, a sorting unit and non-transitory computer readable medium for sorting. The sorting is highly effective and fast—as is requires few computational resources and each sorting iteration may be executed within a cycle. The data manipulations are local and the determining of whether to change values of stored data are made locally and in parallel—thus simplifying the decision, reducing communication and timing constraints related to transfer of data, and accelerating the sorting.

FIG. 1 illustrates an example of a receiver 20.

Receiver 20 includes one or more antennas 21, analog front end 22 that may include an analog to digital converter 23, downconverter 25, decimator 26, scaler 27, correlator 28, parameter calculator 29, message detector 31, message decoder 33, and communication module 34.

HF signals are received by the one or more antennas 21 are fed to analog front end 22 and are converted to digital received signals by analog to digital converter 23, converted from RF signals to baseband signals by downconverter 25, have their sampling rate decreased (for example from 125 Mpsp to 10 ksps) by decimator 26, in case of fixed point format being scale to a fixed point format (for example of 16 bits) by scaler 27, undergo frequency to time conversion (such as inverse Fast Fourier transform—IFFT) by correlator 28, having some of their parameters (such as energy parameters) by parameter calculator 29, being detected (symbol detection) by message detector 31, being reconstructed and/or otherwise have their embedded message detected by message decoder 33, and sent to another module of the receiver or to another unit by communication module 34.

The frequency to time conversion may be applied on signals received within a time window (window). The duration of the window may be substantially equal to the duration of a symbol.

Figure 2:
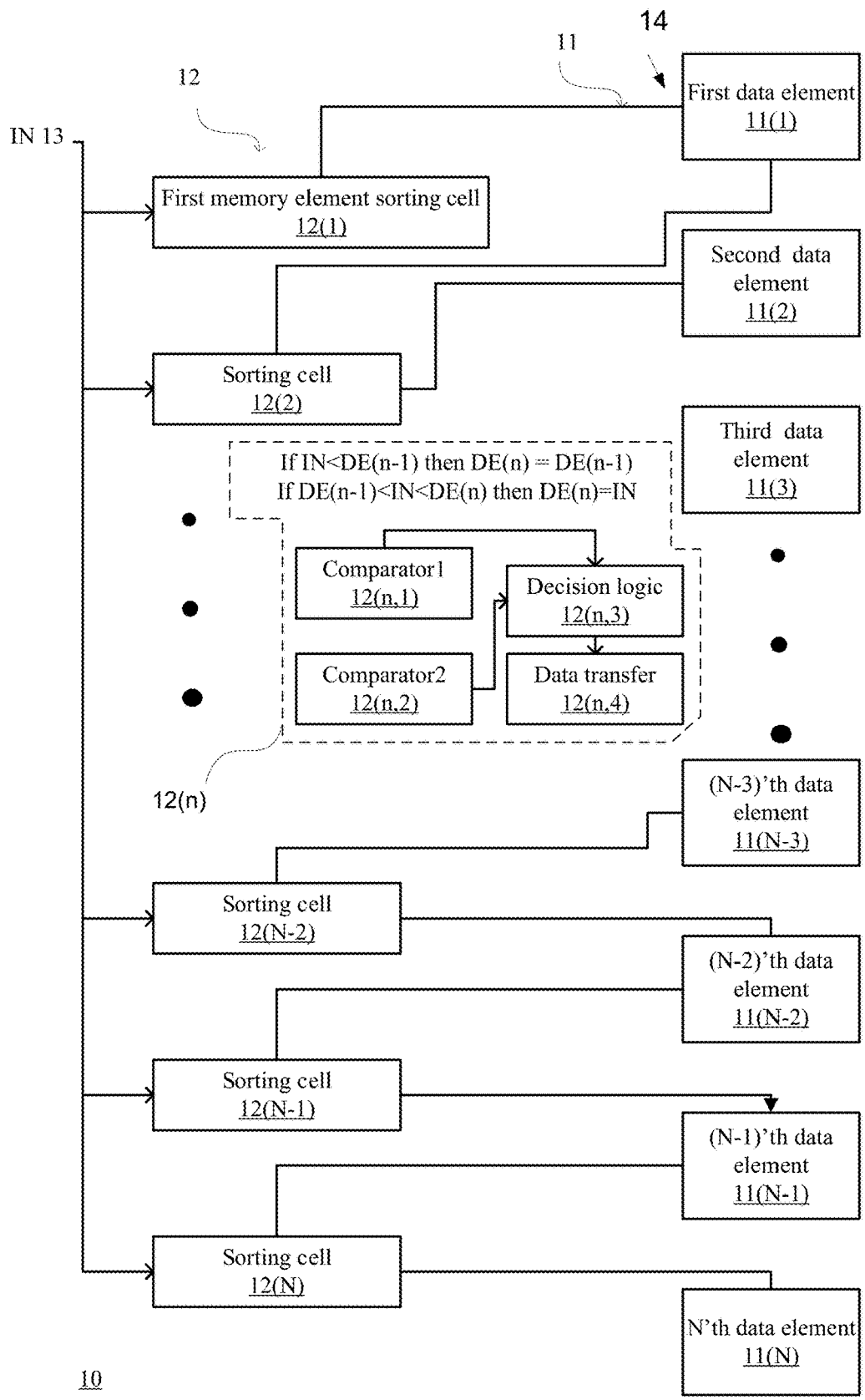
FIG. 2 illustrates an example of a sorting unit.

The message detector 31 may include a sorting unit—such as the sorting unit of FIG. 2.

FIG. 2 illustrates an example of a sorting unit 10 while FIG. 3 illustrates an example of the operations executed by the sorting cells.

Sorting unit 10 includes an input for receiving an input value IN 13, N sorting cells 12(1)-12(N) and N memory elements (collectively denoted 14) for storing N data elements 11(1)-11(N).

The first memory element sorting cell 12(1) is configured to replace the content of the first memory element by IN 13 when IN 13 is lower than a current value of the first memory element: if IN<DE(1) then DE(1)=IN.

The other sorting cells (12(1)-12(N)) are allocated to pairs of memory elements and perform a more complex operation.

For example, for index n that ranges between 2 and N, and for data elements DE(n) and DE(N−1)—the n'th sorting cell performs the following operation:

If IN<DE(n−1) then DE(n)=DE(n−1)

If DE(n−1)<IN<DE(n) then DE(n)=IN

The first comparator $12(n,1)$ of sorting cell $12(n)$ compares IN to DE(n−1).

The second comparator $12(n,2)$ of sorting cell $12(n)$ compares IN to DE(n).

The decision logic $12(n,3)$ of sorting cell $12(n)$ determines whether to maintain the values of the n'th and the (n−1)'th memory elements unchanged, whether to set the value of DE(n) to DE(N−1) or to IN, and the data transfer unit $12(n,4)$ perform the required value changes.

Figure 4:
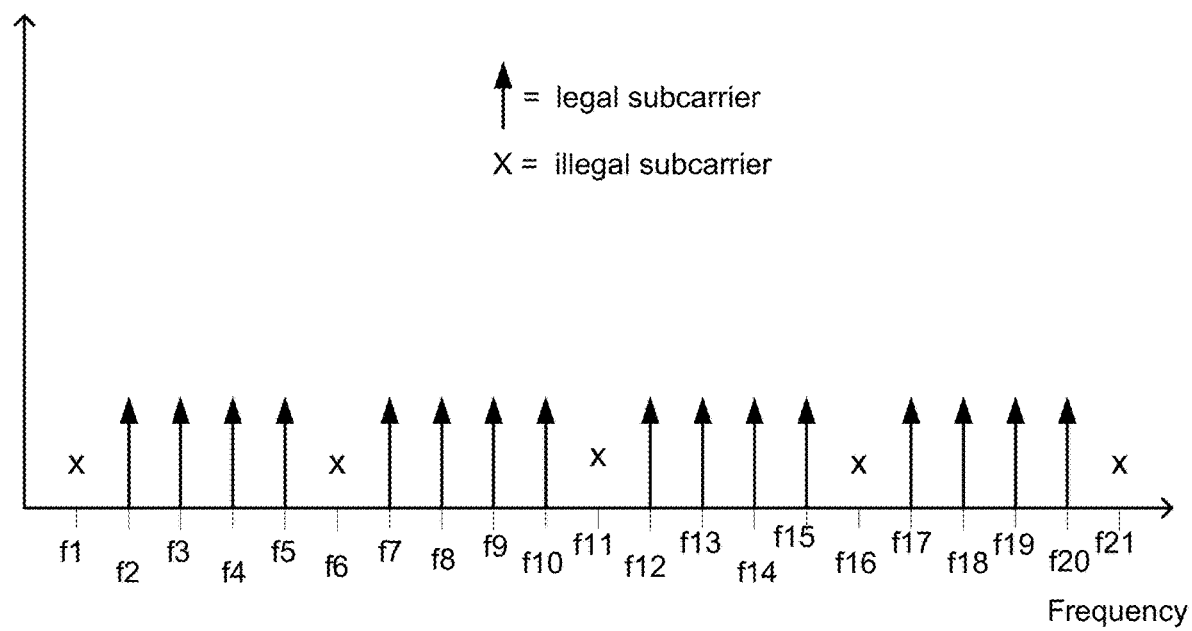
FIG. 4 illustrates an example of illegal subcarriers and legal subcarriers.

FIG. 4 illustrates an example of legal sub-carriers and illegal sub-carriers of a skywave symbol. In this example there are twenty one sub-carriers that include sixteen legal sub-carriers and five (fa, f6, f11, f16 and f21) illegal sub-carriers. The number of illegal sub-carriers and the spreading of the illegal subcarriers may differ from those illustrated in FIG. 4.

The skywave receiver may receive received signals and may perform various operations to determine whether the received signals form a skywave symbol.

The various operations may include detecting received signals that belong to legal subcarriers, detecting received signals that belong to illegal subcarriers, and performing one or more operations for reducing detection errors. Sorting the received signals according to their intensities may assist in at least one of said various operations.

FIG. 5 illustrates an example of a method 200 for detecting a skywave symbol.

Method 200 may start by step 210 of receiving, by a skywave receiver, signals of different subcarriers that are within a skywave frequency range that comprises legal subcarriers and illegal subcarriers.

Step 210 may be followed by step 220 of processing the received signals to provide a detection result that is indicative of a reception of the skywave symbol or of a lack of reception of the skywave symbol.

Step 220 may also include determining the content of the skywave symbol when the detection result is indicative of the reception of the skywave symbol.

Step 220 may include steps 230, 240 and 250.

Step 230 may include determining received signals intensities.

Step 230 may be followed by step 240 of performing sorting iterations. A sorting iteration may be executed per each new IN that should be added to the sorted list.

Each sorting iteration starts with a currently sorted list of signals intensities and provides as an output a next sorted list of signals intensities.

A performing of each sorting iteration (of the sorting iterations) may include performing sorting operations to provide a next sorted list of signals intensities.

Different sorting cells of a group of sorting cells are allocated to different pairs of consecutive memory elements of an array of memory elements. A first memory element sorting cell may be allocated to the first memory element.

A sorting iteration may include comparing, in parallel and by the group, a current unsorted signal intensity (IN) to a currently sorted list of signals intensities to provide results, and performing, in parallel and by the group of sorting cells, one or more data element placement operations based on the results.

The comparing and the sorting may include (a) performing, for n between 2 and N—by the second till N'th sorting cell: If IN<DE(n−1) then DE(n)=DE(n−1), and if DE(n−1) <IN<DE(n) then DE(n)=IN, and (b) performing by the first memory element sorting cell: IN<DE(1) then DE(1)=IN.

Accordingly, a comparing by a sorting cell of the group (except the first memory element sorting cell), includes comparing the current unsorted signal intensity to a first value and to a second value, wherein the sorting cell is allocated to a pair of memory elements; wherein the first value is stored in a first memory element of the pair and the second value is stored in the second memory element of the pair, wherein the first value does not exceeds the second value.

A performing of a data element placement by the sorting cell includes: (a) maintaining the first value and the second value when the current unsorted signal intensity exceeds the first value and the second value; (b) storing the current unsorted signal intensity in the second memory element when the current unsorted signal intensity is smaller than the second value and exceeds the first value; and (c) storing the first value in the second memory element when the current unsorted signal intensity is smaller than the second value and is smaller than the first value.

A memory element is associated with a pair of consecutive sorting cells.

The memory elements may be registers or other logic circuitry.

The memory elements may belong to a memory unit such as a random access memory (RAM) memory unit.

Step 240 may be followed by step 250 of providing the detection result based on at least some members of the sorted list.

Step 250 may include at least some out of:

a. Step 251 of calculating a first sum of signals intensities of a highest valued segment of the sorted list of signals intensities. The highest valued segment includes the highest valued signals intensities—for example the N1 highest signals intensities. N1 is a positive integer. N1 may equal the number of expected legal carriers that convey data (include transmitted content). N1 may differ from said number.

b. Step 253 of calculating a second sum of signals intensities of a second highest valued segment of the sorted list of signals intensities. The second highest valued segment includes N2 signals intensities that follow the N1 highest signals intensities.

c. Step 255 of determining that the received signals are not a part of the skywave symbol when a first ratio between the first sum and the second sum is below a first predefined ratio. This may indicate that the received signals are noise or other interference.

d. Step 257 of determining that the received signals are not a part of the skywave symbol when (i) a first ratio between the first sum and the second sum is not below a first predefined ratio, and (ii) another intensity parameter is not fulfilled, wherein the other intensity parameter is related to the signals intensities of the highest valued segment and to signals intensities of a lowest valued segment of the sorted list of signals intensities. The lowest values segment includes the lowest signals intensities and they may be regarded as illegal subcarriers. The other intensity parameter is aimed to reduce false detection—based on the assumption that when a skywave symbol is transmitted the signals intensities of the legal subcarrier that convey data are strong enough in comparison to noises or interruptions.

e. Step 259 of determining that the received signals are a part of the skywave symbol when (i) a first ratio between the first sum and the second sum is not below a first predefined ratio, and (ii) another intensity parameter is fulfilled, wherein the other intensity parameter is related to the signals intensities of the highest valued segment and to signals intensities of a lowest valued segment of the sorted list of signals intensities.

The skywave symbol may be an orthogonal frequency division multiplexing (OFDM) skywave symbol.

The skywave symbol may be transmitted over an asynchronous skywave communication channel.

The duration of the detecting may be less than a length of the skywave symbol.

Figure 6:
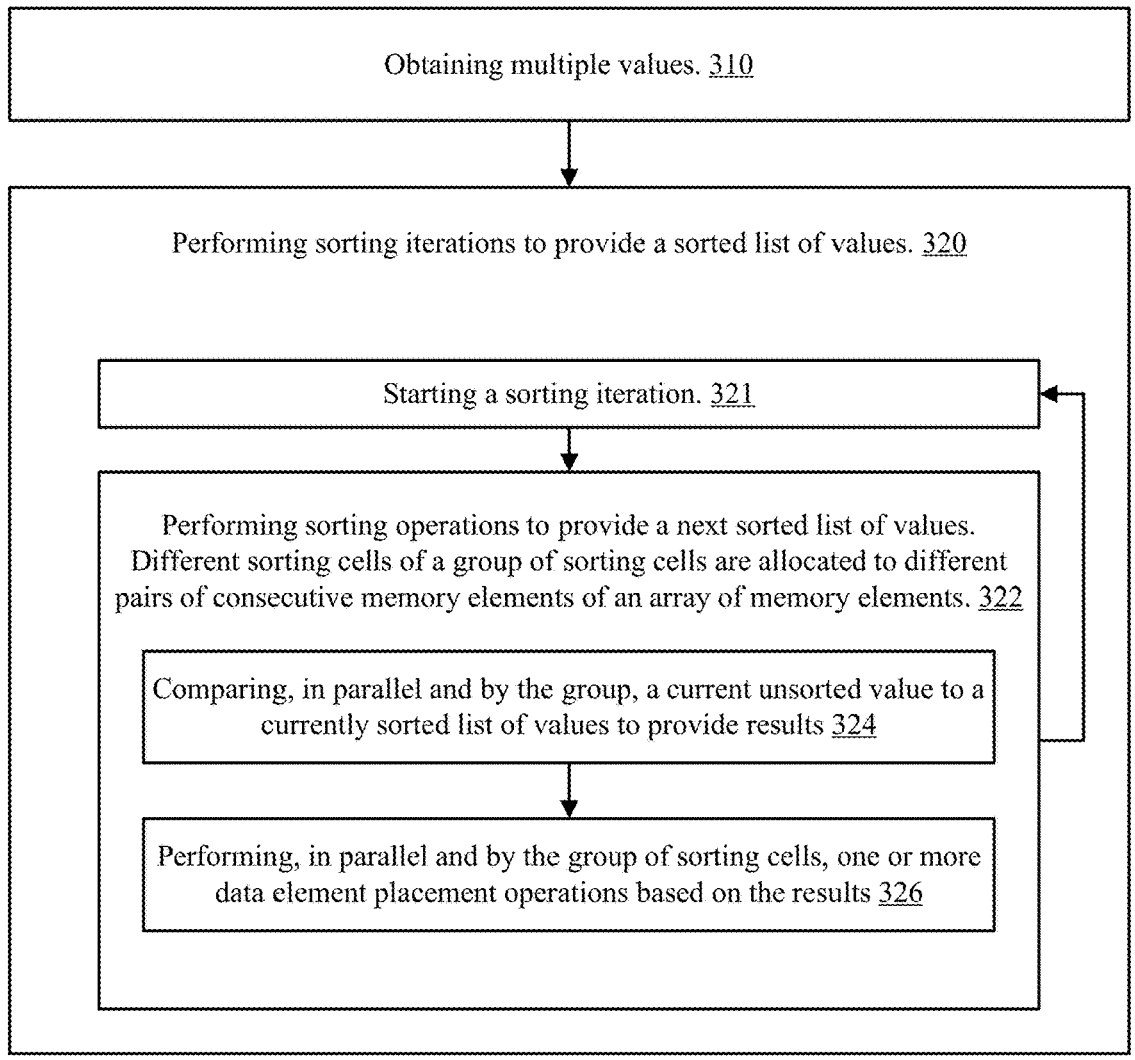
FIG. 6 illustrates an example of a method.

FIG. 6 illustrates an example of method 300 for sorting values.

Method 300 may start by step 310 of obtaining multiple values. The multiple values should be sorted to provide a sorted list of values.

The multiple values may be received in parallel and stored in a buffer and/or may be received one group of values per time—or even one value at a time.

For simplicity of explanation it is assumed that one value is received per time by a sorting cell.

Step 310 may be followed by step 320 of performing sorting iterations to provide a sorted list of values.

Step 320 may include step 321 of starting a sorting iteration.

Step 321 may be followed by step 322 of performing sorting operations to provide a next sorted list of values. Different sorting cells (for example the second till N'th sorting cells) of a group of sorting cells are allocated to different pairs of consecutive memory elements of an array of memory elements.

Step 322 may include (a) step 324 of comparing, in parallel and by the group, a current unsorted value to a currently sorted list of values to provide results, and (b) step 326 of performing, in parallel and by the group of sorting cells, one or more data element placement operations based on the results.

Step 324 may include multiple (for example N−1) sorting cell operations—each sorting cell operation is executed by a sorting cell and includes comparing the current unsorted value to a first value and to a second value, wherein the sorting cell is allocated to a pair of memory elements; wherein the first value is stored in a first memory element of the pair and the second value is stored in the second memory element of the pair, wherein the first value does not exceeds the second value.

Step 325 may include multiple (for example N−1) data placement operations—each sorting cell operation is executed by a sorting cell and includes:
  a. Maintaining the first value and the second value when the current unsorted value exceeds the first value and the second value.
  b. Storing the current unsorted value in the second memory element when the current unsorted value is smaller than the second value and exceeds the first value.
  c. Soring the first value in the second memory element when the current unsorted value is smaller than the second value and is smaller than the first value.

Figure 7:
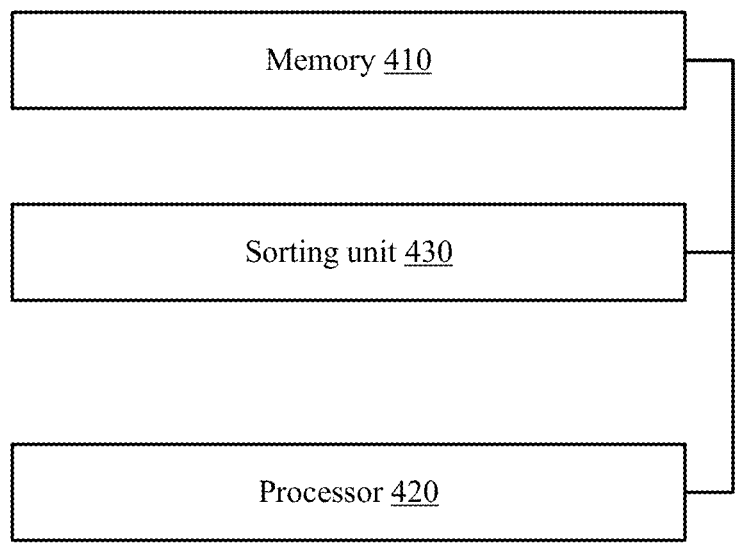
FIG. 7 illustrates an example of a system.

FIG. 7 illustrates an example of a system 400 that includes a memory 410, sorting unit 430 and processor 420. The sorting unit may belong to the processor but may not belong to the processor. Memory unit may store data elements and/or any instructions and/or data and/or metadata for executing method 300. The processor may include one or more processing circuits. A processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

The first and second skywave symbols may be asynchronous skywave symbols.

The first and second skywave symbols may be orthogonal frequency division multiplexing (OFDM) skywave symbols.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation; a single operation may be distributed in additional operations and operations may be executed at least partially overlapping in time. Moreover, alternative embodiments may include multiple instances of an operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The terms "including", "comprising", "having", "consisting" and "consisting essentially of" are used in an interchangeable manner. For example—any method may include at least the steps included in the figures and/or in the specification, only the steps included in the figures and/or the specification.

We claim:

1. A method for detecting a skywave symbol, the method comprises:
  receiving, by a skywave receiver, signals of different subcarriers that are within a skywave frequency range that comprises legal subcarriers and illegal subcarriers;
  performing sorting iterations to provide a sorted list of signals intensities; and
  providing a detection result indicative of a reception of the skywave symbol based on at least some members of the sorted list;
  wherein the performing of the sorting iteration comprise, repeating for each sorting iteration:

performing sorting operations to provide a next sorted list of signals intensities; wherein different sorting cells of a group of sorting cells are allocated to different pairs of consecutive memory elements of an array of memory elements;

wherein a sorting iterations comprise:
(i) comparing, in parallel and by the group, a current unsorted signal intensity to a currently sorted list of signals intensities to provide results, and
(ii) performing, in parallel and by the group of sorting cells, one or more data element placement operations based on the results;

wherein a comparing by a sorting cell of the group, comprises comparing the current unsorted signal intensity to a first value and to a second value, wherein the sorting cell is allocated to a pair of memory elements; wherein the first value is stored in a first memory element of the pair and the second value is stored in the second memory element of the pair, wherein the first value does not exceeds the second value;

wherein a performing of a data element placement by the sorting unit comprises:
maintaining the first value and the second value when the current unsorted signal intensity exceeds the first value and the second value;
storing the current unsorted signal intensity in the second memory element when the current unsorted signal intensity is smaller than the second value and exceeds the first value; and
storing the first value in the second memory element when the current unsorted signal intensity is smaller than the second value and is smaller than the first value.

2. The method according to claim 1 wherein each memory element of at least most of the memory elements, is associated with a pair of consecutive sorting cells.

3. The method according to claim 1 wherein the memory elements are registers.

4. The method according to claim 1 wherein the memory elements belong to a random access memory unit.

5. The method according to claim 1 wherein the providing of the detection result comprises calculating a first sum of signals intensities of a highest valued segment of the sorted list of signals intensities.

6. The method according to claim 5 wherein the providing of the detection result comprises calculating a second sum of signals intensities of a second highest valued segment of the sorted list of signals intensities.

7. The method according to claim 6 wherein the providing of the detection result comprises determining that the received signals are not a part of the skywave symbol when a first ratio between the first sum and the second sum is below a first predefined ratio.

8. The method according to claim 6 wherein the providing of the detection result comprises determining that the received signals are not a part of the skywave symbol when (i) a first ratio between the first sum and the second sum is not below a first predefined ratio, and (ii) another intensity parameter is not fulfilled, wherein the other intensity parameter is related to the signals intensities of the highest valued segment and to signals intensities of a lowest valued segment of the sorted list of signals intensities.

9. The method according to claim 6 wherein the providing of the detection result comprises determining that the received signals are not a part of the skywave symbol when (i) a first ratio between the first sum and the second sum is not below a first predefined ratio, and (ii) another intensity parameter is fulfilled, wherein the other intensity parameter is related to the signals intensities of the highest valued segment and to signals intensities of a lowest valued segment of the sorted list of signals intensities.

10. The method according to claim 1 wherein the skywave symbol is an orthogonal frequency division multiplexing (OFDM) skywave symbol.

11. The method according to claim 1 wherein the skywave symbol is transmitted over an asynchronous skywave communication channel.

12. The method according to claim 1 wherein a duration of the detecting is less than a length of the skywave symbol.

13. A non-transitory computer readable medium that stores instructions for:
receiving, by a skywave receiver, signals of different subcarriers that are within a skywave frequency range that comprises legal subcarriers and illegal subcarriers;
performing sorting iterations to provide a sorted list of signals intensities; and
providing a detection result indicative of a reception of the skywave symbol based on at least some members of the sorted list;
wherein the performing of the sorting iteration comprise repeating for each sorting iteration:
performing sorting operations to provide a next sorted list of signals intensities;
wherein different sorting cells of a group of sorting cells are allocated to different pairs of consecutive memory elements of an array of memory elements;
wherein a sorting iterations comprise:
(i) comparing, in parallel and by the group, a current unsorted signal intensity to a currently sorted list of signals intensities to provide results, and
(ii) performing, in parallel and by the group of sorting cells, one or more data element placement operations based on the results;
wherein a comparing by a sorting cell of the group, comprises comparing the current unsorted signal intensity to a first value and to a second value, wherein the sorting cell is allocated to a pair of memory elements; wherein the first value is stored in a first memory element of the pair and the second value is stored in the second memory element of the pair, wherein the first value does not exceeds the second value;
wherein a performing of a data element placement by the sorting unit comprises:
maintaining the first value and the second value when the current unsorted signal intensity exceeds the first value and the second value;
storing the current unsorted signal intensity in the second memory element when the current unsorted signal intensity is smaller than the second value and exceeds the first value; and
storing the first value in the second memory element when the current unsorted signal intensity is smaller than the second value and is smaller than the first value.

14. A skywave receiver, comprising:
an input module that is configured to receive signals of different subcarriers that are within a skywave frequency range that comprises legal subcarriers and illegal subcarriers; and
a message detector that is configured to:
perform sorting iterations to provide a sorted list of signals intensities; and provide a detection result indicative of a reception of the skywave symbol based on at least some members of the sorted list;

wherein the message detector is configured to perform the sorting iterations by repeating for each sorting iteration:

performing sorting operations to provide a next sorted list of signals intensities;

wherein different sorting cells of a group of sorting cells are allocated to different pairs of consecutive memory elements of an array of memory elements;

wherein a sorting iterations comprise:
 (i) comparing, in parallel and by the group, a current unsorted signal intensity to a currently sorted list of signals intensities to provide results, and
 (ii) performing, in parallel and by the group of sorting cells, one or more data element placement operations based on the results;

wherein a comparing by a sorting cell of the group, comprises comparing the current unsorted signal intensity to a first value and to a second value, wherein the sorting cell is allocated to a pair of memory elements; wherein the first value is stored in a first memory element of the pair and the second value is stored in the second memory element of the pair, wherein the first value does not exceeds the second value;

wherein a performing of a data element placement by the sorting unit comprises:

maintaining the first value and the second value when the current unsorted signal intensity exceeds the first value and the second value;

storing the current unsorted signal intensity in the second memory element when the current unsorted signal intensity is smaller than the second value and exceeds the first value; and storing the first value in the second memory element when the current unsorted signal intensity is smaller than the second value and is smaller than the first value.

15. The skywave receiver according to claim 14 wherein each memory element of at least most of the memory elements, is associated with a pair of consecutive sorting cells.

16. The skywave receiver according to claim 14 wherein the message detector is configured to provide the detection result by calculating a first sum of signals intensities of a highest valued segment of the sorted list of signals intensities.

17. The skywave receiver according to claim 16 wherein the message detector is configured to provide the detection result by calculating a second sum of signals intensities of a second highest valued segment of the sorted list of signals intensities.

18. The skywave receiver according to claim 17 wherein the message detector is configured to provide the detection result by determining that the received signals are not a part of the skywave symbol when a first ratio between the first sum and the second sum is below a first predefined ratio.

19. The skywave receiver according to claim 17 wherein the message detector is configured to provide the detection result by determining that the received signals are not a part of the skywave symbol when (i) a first ratio between the first sum and the second sum is not below a first predefined ratio, and (ii) another intensity parameter is not fulfilled, wherein the other intensity parameter is related to the signals intensities of the highest valued segment and to signals intensities of a lowest valued segment of the sorted list of signals intensities.

20. The skywave receiver according to claim 17 wherein the message detector is configured to provide the detection result by determining that the received signals are not a part of the skywave symbol when (i) a first ratio between the first sum and the second sum is not below a first predefined ratio, and (ii) another intensity parameter is fulfilled, wherein the other intensity parameter is related to the signals intensities of the highest valued segment and to signals intensities of a lowest valued segment of the sorted list of signals intensities.

* * * * *